(12) United States Patent
Kochura et al.

(10) Patent No.: US 10,956,239 B1
(45) Date of Patent: Mar. 23, 2021

(54) UTILIZING SOURCE CONTEXT AND CLASSIFICATION IN A COPY OPERATION

(71) Applicant: International Business Machines Corporation, Armonk, NY (US)

(72) Inventors: Nadiya Kochura, Bolton, MA (US); Anh Uong, Topsfield, MA (US); Daniel Manning, Winthrop, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/554,091

(22) Filed: Aug. 28, 2019

(51) Int. Cl.
| | | |
|---|---|---|
| G06F 17/00 | (2019.01) | |
| G06F 9/54 | (2006.01) | |
| G06F 16/35 | (2019.01) | |
| G06F 3/0484 | (2013.01) | |
| G06F 16/93 | (2019.01) | |
| G06F 40/20 | (2020.01) | |
| G06F 40/166 | (2020.01) | |

(52) U.S. Cl.
CPC .......... G06F 9/543 (2013.01); G06F 3/04842 (2013.01); G06F 16/355 (2019.01); G06F 16/93 (2019.01); G06F 40/166 (2020.01); G06F 40/20 (2020.01)

(58) Field of Classification Search
None
See application file for complete search history.

(56) References Cited

U.S. PATENT DOCUMENTS

| | | |
|---|---|---|
| 6,944,821 B1 | 9/2005 | Bates |
| 7,237,189 B2 | 6/2007 | Altenhofen |
| 8,296,671 B2 * | 10/2012 | Narayanan ............ G06F 3/0484 715/770 |
| 9,445,152 B2 | 9/2016 | Proidl |
| 9,514,108 B1 | 12/2016 | Chen |
| 10,650,086 B1 * | 5/2020 | Knudson ............... G06F 40/242 |
| 2004/0015785 A1 | 1/2004 | Lin |

(Continued)

FOREIGN PATENT DOCUMENTS

EP    3196798 A1    7/2017

OTHER PUBLICATIONS

"Calling a method when content of clipboard is changed", edited Jan. 9, 2013, 9 pps., <https://stackoverflow.com/questions/14226064/calling-a-method-when-content-of-clipboard-is-changed>.

(Continued)

*Primary Examiner* — Mustafa A Amin
(74) *Attorney, Agent, or Firm* — Daniel R. Simek

(57) ABSTRACT

Aspects of the present invention disclose a method, computer program product, and system for augmenting a copy operation with contextual information from a source. The method includes one or more processors determining that a user provides input selecting content, within a document, and input adding the selected content to a clipboard. The method further includes one or more processors determining a classification of the selected content based on analyzing the selected content and the document utilizing Natural Language Processing (NLP). The method further includes one or more processors extracting information associated with the selected content from the document based on the determined classification. The method further includes one or more processors updating the clipboard with the selected content and the extracted information.

19 Claims, 3 Drawing Sheets

(56) References Cited

U.S. PATENT DOCUMENTS

| | | | |
|---|---|---|---|
| 2005/0203935 A1 | 9/2005 | McArdle | |
| 2006/0218492 A1 | 9/2006 | Andrade | |
| 2007/0011749 A1 | 1/2007 | Allison | |
| 2008/0028442 A1 | 1/2008 | Kaza | |
| 2008/0109832 A1* | 5/2008 | Ozzie | G06F 3/048 719/329 |
| 2011/0126092 A1 | 5/2011 | Harris | |
| 2016/0034602 A1 | 2/2016 | Weksler | |
| 2017/0039326 A1* | 2/2017 | Stankiewicz | G06Q 10/063 |
| 2017/0154188 A1 | 6/2017 | Meier | |
| 2019/0129939 A1* | 5/2019 | Hewitt | G06F 9/543 |

OTHER PUBLICATIONS

"Driving in Moose Country", Alaska Department of Fish and Game, Printed on Jul. 12, 2019, 3 pps., <http://www.adfg.alaska.gov/index.cfm?adfg=livewith.drivingmoosecountry>.

"Entity extraction: How does it work?", May 16, 2016, Expert System, 9 pps., <https://www.expertsystem.com/entity-extraction-work/>.

"Guidelines for training classifiers", Last Updated: Jun. 4, 2019, IBM Coloud Docs/Visual Recognition, <https://cloud.ibm.com/docs/services/visual-recognition?topic=visual-recognition-customizing#guidelines-for-training-classifiers>.

"How to Cite a Website", Copyright © 2019 Mendeley Ltd., RELIX Group™, 15 pps., <https://www.mendeley.com/guides/web-citation-guide>.

"JavaScript get clipboard data on paste event (Cross browser)", Imagine yourself at Squarespace, 23 pps., edited Dec. 11, 2014, <https://stackoverflow.com/questions/2176861/javascript-get-clipboard-data-on-paste-event-cross-browser>.

"Natural Language Understanding", IBM, Think 2019, Watson, 8 pps., printed from the internet on Jul. 12, 2019, <https://www.ibm.com/watson/services/natural-language-understanding/>.

Cerf, "A Comprehensive Self-Driving Car Test", IBM Yorktown Heights, Communications of the ACM, Feb. 2018, vol. 61 No. 2, p. 7 10.1145/3177753, <https://cacm.acm.org/magazines/2018/2/224621-a-comprehensive-self-driving-car-test/fulltext>.

Grzywaczewski, "Training AI for Self-Driving Vehicles: the Challenge of Scale", Oct. 9, 2017, Nvidia developer, 16 pps., <https://devblogs.nvidia.com/training-self-driving-vehicles-challenge-scale/ >.

Karunakaran, "Entity extraction using Deep Learning based on Guillaume Genthial work on NER", Medium, Apr. 1, 2018, Intro to Artificial Intelliegence, 8 pps., <https://medium.com/intro-to-artificial-intelligence/entity-extraction-using-deeplearning-8014acac6bb8>.

Sun, "Short Text Classification Using Very Few Words", 2 pps., SIGIR'12, Aug. 12-16, 2012, Portland, Oregon, USA. ACM 978-1-4503-1472—May 12, 2008, <https://www.researchgate.net/publication/254464538_Short_text_classification_using_very_few_words>.

Zeng, et al., "Topic Memory Networks for Short Text Classification", Computer Science > Computation and Language, Science WISE, submitted Sep. 11, 2018, 12 pps., <https://arxiv.org/abs/1809.03664>.

Korba, et al., "Private data discovery for privacy compliance in collaborative environments", 11 pps., Published in the Proceedings of the Fifth International Conference on Cooperative Design, Visualization and Engineering (CDVE 2008), Palma de Mallorca, Mallorca, Sep. 21-25, 2008, NRC 50386, <https://books.google.com/books?d=Es6pCAAAQBAJ&pg=PA143&lpg=PA143&dq=copy+private+#v=onepage&q=copy%20private&f=false>.

* cited by examiner

UTILIZING SOURCE CONTEXT AND CLASSIFICATION IN A COPY OPERATION

BACKGROUND OF THE INVENTION

The present invention relates generally to the field of content management, and more particularly to augmenting a copy operation with contextual information from a source.

Copying information from various data sources is a common and effective method for creating and updating electronic documents. In human—computer interaction and user interface design, cut, copy and paste are related commands that offer an inter-process communication technique for transferring data through a computer's user interface. The cut command removes the selected data from its original position, while the copy command creates a duplicate; in both cases the selected data is kept in a temporary storage device called the clipboard (i.e., a copy/paste buffer or cache). The data in the clipboard is later inserted in the position where the paste command is issued. The data is available to any application supporting the feature, thus allowing easy data transfer between applications. The clipboard is a buffer that some operating systems provide for short-term storage and transfer within and between application programs. The clipboard is usually temporary and unnamed, and its contents reside in the computer's random-access memory (RAM). The clipboard is sometimes called the paste buffer or the copy/paste buffer.

SUMMARY

Aspects of the present invention disclose a method, computer program product, and system for augmenting a copy operation with contextual information from a source. The method includes one or more processors determining that a user provides input selecting content, within a document, and input adding the selected content to a clipboard. The method further includes one or more processors determining a classification of the selected content based on analyzing the selected content and the document utilizing Natural Language Processing (NLP). The method further includes one or more processors extracting information associated with the selected content from the document based on the determined classification. The method further includes one or more processors updating the clipboard with the selected content and the extracted information. In another embodiment, the method further includes in response to receiving a request from the user to initiate a paste operation to a target location, one or more processors pasting the selected content and the extracted information from the clipboard to the target location.

DETAILED DESCRIPTION

Embodiments of the present invention allow for an intelligent system for enhancing the copying and pasting of information. Embodiments of the present invention can analyze content that is copied to a clipboard to identify contextual attributes that are associated with the data. In an example scenario, embodiments of the present invention identify that an author of source content provides a citation link for use when the content is copied and shared. Accordingly, embodiments of the present invention can identify the author preference, extract relevant information (e.g., as metadata) from the source content, and include the extracted information in the clipboard (i.e., copy/paste buffer). Upon pasting the source content, embodiments of the present invention automatically augment the target location (e.g., target document) with the extracted information and additional information based on a classification of the source and/or target.

Some embodiments of the present invention recognize that copying information is a common and effective method for creating and updating electronic documents. However, during the copying of information, the original context can be lost, which can result in improper, incomplete, or misleading usage of the copied information. Embodiments of the present invention recognize the benefits of a system that can transfer contextual information during a copy/paste operation.

Various embodiments of the present invention provide advantages, which include providing a system that preserves information context during a copy/paste operation. Additional embodiments of the present invention apply transformation rule during copy/paste operations to ensure the information context is replicated at the target location.

Embodiments of the present invention also provide advantages of learning the association between content categories and context attributes or context entities. Accordingly, embodiments of the present invention can apply the associations and classifications at runtime, to identify and extract context attributes from the source document and including the extracted information in the clipboard during the copy/paste operation. Further embodiments of the present invention provide an additional advantage of utilizing machine learning and natural language processing (NLP) to classify the source document and utilize the classification to determine which context attributes to extract and include in the clipboard or copy/paste buffer.

Implementation of embodiments of the invention may take a variety of forms, and exemplary implementation details are discussed subsequently with reference to the Figures.

Figure 1:
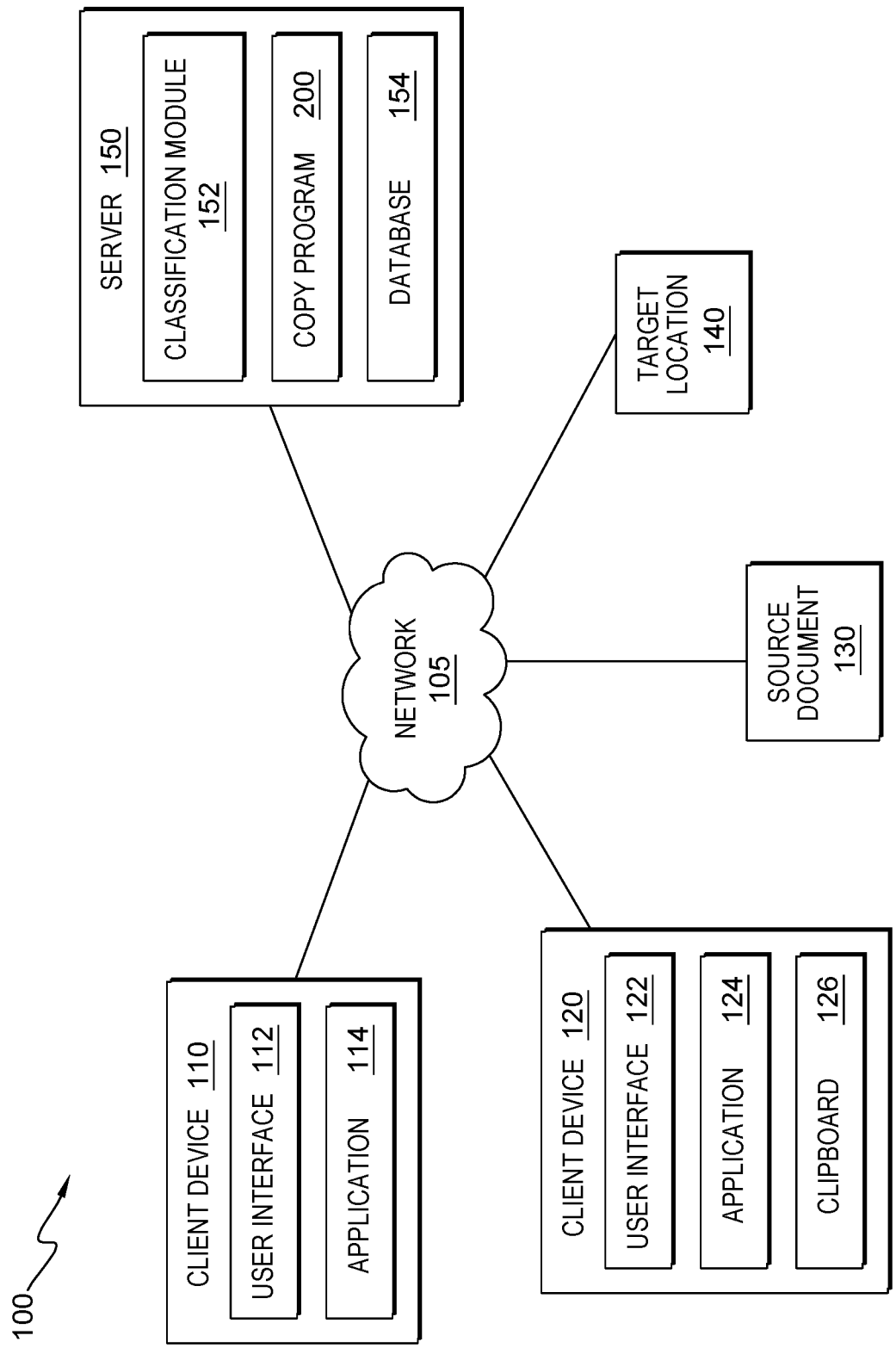
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, client device 120, source document 130, target location 140, and server 150, all interconnected over network 105. In an example embodiment, an individual utilizing client device 110 is an author of content included in source document 130 and an individual utilizing client device 120 selects the authored content from source document for a copy operation (e.g., to target location 140). In this example embodiment, server 150 provides services (e.g., classification module 152 and copy program 200) to enhance the copy operation with contextual information associated with the authored content, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, client device 120, source document 130, target location 140, and server 150, in accordance with embodiments of the present invention. In various embodiments, network 105 facilitates communication among a plurality of networked computing devices (e.g., client device 110 and client device 120), corresponding users (e.g., an individual utilizing client device 110 and/or client device 120), data sources (e.g., source document 130, target location 140) and corresponding management services (e.g., server 150).

In various embodiments of the present invention, client device 110 and client device 120 may be a workstation, personal computer, personal digital assistant, mobile phone, or any other device capable of executing computer readable program instructions, in accordance with embodiments of the present invention. In general, client device 110 and client device 120 are representative of any electronic device or combination of electronic devices capable of executing computer readable program instructions. Client device 110 and client device 120 may include components as depicted and described in further detail with respect to FIG. 3, in accordance with embodiments of the present invention. In an example embodiment, client device 110 and client device 120 are smart devices, such as a smartphone, a smart watch, etc.

Client device 110 includes user interface 112 and application 114. User interface 112 is a program that provides an interface between a user of client device 110 and a plurality of applications that reside on the computing device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on client device 110. In an example embodiment, application 114 is a client-side application of an enterprise associated with server 150 and source document 130. In another example embodiment, application 114 is a web browser that an individual utilizing client device 110 utilizes (e.g., via user interface 112) to access and provide information over network 105, such as providing information (e.g., code) to source document 130, defining code use parameters and preferences to server 150, etc. In other aspects of the present invention, application 114 can be representative of applications that provide additional functionality (e.g., camera, messaging, etc.), in accordance with various aspects of the present invention.

In additional aspects of the present invention, client device 120 includes user interface 122, application 124, and clipboard 126. The respective instances of user interface 122 and application 124 include functionality as described above, with regard to respective instances of user interface 112 and application 114. In an example embodiment, client device 110 and client device 120 are personal computing devices, where a user of client device 110 is an author of code included in source document 130 and a user of client device 120 is copying the code (provided by the user of client device 110) in source document 130.

Clipboard 126 is a buffer (i.e., a copy/paste buffer) that client device 120 utilizes for storing data for transfer within or between applications or sources. In various embodiments, client device 120 hosts clipboard 126 in random-access memory (RAM). In example embodiments, clipboard 126 include information that a user of client device 120 has selected for copying. In additional embodiments, clipboard 126 include the information that the user of client device 120 has selected for copying and additional information that server 150 (e.g., via classification module 152 and copy program 200) indicates to associate with the copied information. For example, in response to a user of client device 120 selecting to copy a code snippet from source document 130, clipboard 126 includes a copy of the selected code snippet and associated attribution information, which can be defined by the author of the code snippet (e.g., a user of client device 110). In alternate embodiments, clipboard 126 can be hosted on server 150 and/or client device 120 can replicate clipboard 126 on server 150. For example, client device 120 can replicate information in clipboard 126 to a corresponding location on server 150 (e.g., in database 154).

In various embodiments of the present invention, source document 130 is an exemplary depiction of a location or entity that includes information that is copied in a copy/paste operation (e.g., by a user of client device 120). In an example embodiment, source document 130 is a webpage that includes code snippets, source code, text, etc. In another embodiment, source document 130 is a text document that is hosted and accessible via network 105, which includes text information and associated metadata. In various embodiments, an author of content in source document 130 can define that if a portion of content is copied, the copy/paste operation will also include specified information. For example, a user of client device 110 posts a code snippet to source document 130 and defines (e.g., tag) that if the code snippet is included in a copy/paste operation, then an author citation is also included in the clipboard. In this example, source document 130 includes the user preference and definition as metadata tags associated with the code snippet. In various embodiments, source document 130 can be a webpage, text document, file, application, repository, or location accessible over network 105 (e.g., to server 150).

Target location 140 is an exemplary depiction of one or more locations that correspond to a destination for content in a copy/paste operation. For example, a user of client device 120 copies a code snippet from source document 130 to paste the code snippet to target location 140. In various embodiments, target location 140 can be a webpage, text document, file, application, repository, or location accessible over network 105 (e.g., to server 150).

In example embodiments, server 150 can be a desktop computer, a computer server, or any other computer systems, known in the art. In certain embodiments, server 150 represents computer systems utilizing clustered computers and components (e.g., database server computers, application server computers, etc.) that act as a single pool of seamless resources when accessed by elements of data processing environment 100 (e.g., client device 110, client device 120, source document 130, and target location 140). In general, server 150 is representative of any electronic device or combination of electronic devices capable of executing computer readable program instructions. Server 150 may include components as depicted and described in further detail with respect to FIG. 3, in accordance with embodiments of the present invention.

Server 150 includes classification module 152, copy program 200, and database 154. In one embodiment, server 150 operates to manage copy and paste operations associated with one or more users (e.g., client device 110 and client device 120), one or more data sources/locations (e.g., source document 130 and target location 140), or a combination thereof.

In various embodiments of the present invention, server 150 utilizes (in conjunction with copy program 200) classification module 152 to analyze sources and destinations of content (e.g., source document 130 and target location 140) to determine classifications that identify types and categories associated with the respective content location. Classification module 152 can employ a variety of techniques to classify content, such as but not limited to, NLP classification of text, machine learning, Topic Model networks, Zero-shot learning, linguistic analysis image analysis and classification. In example embodiments, classification module 152 operates during a copy/paste operation at runtime to determine and assign tags that correspond to the type and category of content in the copy/paste operation. In an example scenario, in response to a user selecting content for a copy/paste operation, classification module 152 can identify a type and category of the selected content and the location of the selected content (e.g., based on a context of source document 130). For example, classification module can classify selected content into one of a plurality of categories/types, such as confidential, programming code, opinion, medical information, financial information, etc.

In example embodiments, copy program 200 augments a copy operation with contextual information from a source, in accordance with an embodiment of the present invention. In various embodiments, server 150 can utilize copy program 200 in combination with classification module to classify content as a certain category or type and learn context attributes or entities that are associated with content categories/types. Copy program 200 can extract information from a source of content (e.g., entity values associated with a category), such as source document 130, and include the extracted information in a copy/paste buffer (e.g., clipboard 126). Accordingly, server 150 can utilize copy program 200 to preserve the original informational context of content that is copied from one location to another (e.g., from source document 13 to target location 140).

In example embodiments, server 150 includes information associated with registered users (e.g., in database 154) and utilizes information associated with registered users of the content classification and attribution system of server 150 (via copy program 200). For example, an individual utilizing client device 120 completes a registration process, provides information, and authorizes the collection and analysis (i.e., opts-in) of relevant data, by server 150 (e.g., via copy program 200). In various embodiments, a user can opt-in or opt-out of certain categories of data collection. In addition, an author user (e.g., a user of client device 110) can indicate that particular content cannot be copied (e.g., block inclusion in a copy/paste operation).

Database 154 can be implemented with any type of storage device, for example, persistent storage 305, which is capable of storing data that may be accessed and utilized by server 150, client device 110, and client device 120, such as a database server, a hard disk drive, or a flash memory. In other embodiments, database 154 can represent multiple storage devices and collections of data within server 150. In various embodiments, database 154 includes information that copy program 200 can access and utilize, in accordance with embodiments of the present invention.

In one embodiment, database 154 includes content tags that are defined and applied by authors of content. For example, a content creator (e.g., a user of client device 110) associated with a code snippet on source document 130 defines that if the code snippet is to be used externally, then a citation should be applied. In this example, database 154 includes the citation tag associated with the code snippet and the content creator, along with associated attribution information. In additional embodiments, database 154 includes content category and context attribute mapping information, which copy program 200 can utilize and update. For example, database 154 includes mapped associations between content categories and context attributes (e.g., based in information from classification module 152). In various embodiments, copy program 200 can analyze a user's pattern when copying and pasting content to determine whether a particular category of copied content correlates to a target location.

In additional embodiments, database 154 includes mapping information that indicates which types of information (e.g., attributes) that copy program 200 should extract based on a classification of content or source location. For example, database 154 includes an indication that for a code snippet in source document 130, copy program should at least extract a source citation and contact information. In an additional aspect, database 154 can also include mapped associations that are based on user preferences, such as an author's defined tags or preferences for authored content.

Figure 2:
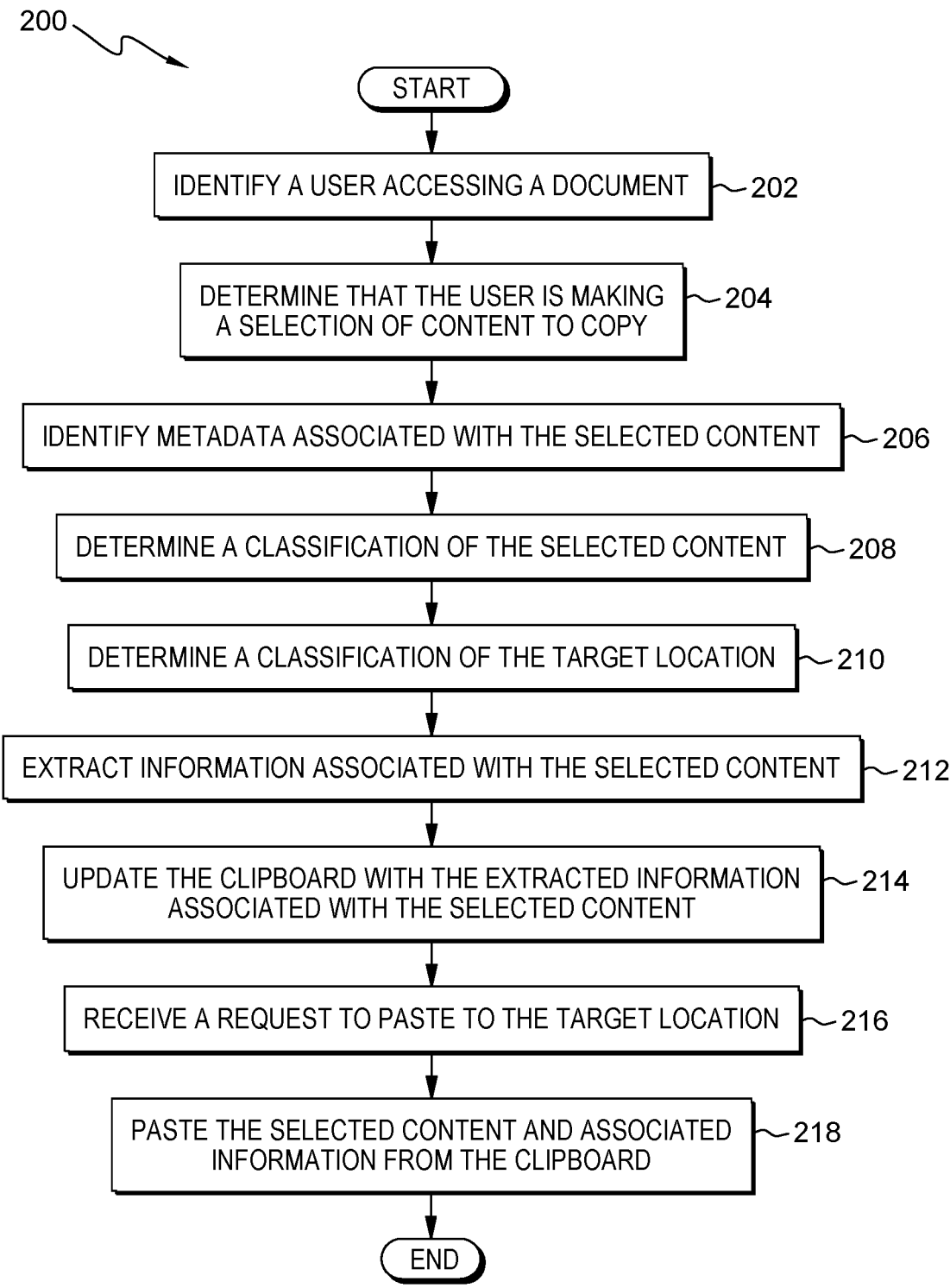
FIG. 2 is a flowchart depicting operational steps of a program for augmenting a copy operation with contextual information from a source, in accordance with an embodiment of the present invention.

FIG. 2 is a flowchart depicting operational steps of copy program 200, a program for augmenting a copy operation with contextual information from a source, in accordance with an embodiment of the present invention. In one embodiment, copy program 200 initiates in response to a user initiating a copy operation (e.g., a user, via a device accessible over network 105, selecting content and providing a command to copy). In another embodiment, copy program 200 initiates in response to a user accessing a document (e.g., a user, via a device accessible over network 105, accesses a document). In various embodiments, copy program 200 operates as a background process while a user is accessing an application, such as application 124 or application 114.

In step 202, copy program 200 identifies a user accessing a document. In one embodiment, copy program 200 identifies that a user of client device 120 is accessing source document 130. In an example scenario, copy program 200 is monitoring a webpage (i.e., source document 130), which has registered and authorized monitoring, for indications of access and initiation of copy operations on included content (e.g., text, code snippets, images, etc.). In this example embodiment, copy program 200 identifies that a user (e.g., of client device 120) accesses the webpage.

In step 204, copy program 200 determines that the user is making a selection to copy. In one embodiment, copy program 200 determines that the user (identified in step 202) has made a selection of content within source document 130 and has provided input initiating a copy operation. For example, copy program 200 determines that the user of client device 120, while accessing source document 130, provides input (e.g., via user interface 122) selecting a code snippet and input initiating a copy operation (e.g., requesting to add content to clipboard 126). In various embodiments of the present invention, copy program 200 identifies the initiation of a copy operation at runtime, to employ the processing of copy program 200 during runtime of a copy/paste operation.

In step 206, copy program 200 identifies metadata associated with the selected content. In one embodiment, copy program 200 identifies metadata that is associated with selected content for the copy operation (from step 204) and the source of the selected content (e.g., source document 130, identified in step 202). Copy program 200 can identify metadata that is included in the source of the copied content (e.g., metadata embedded in source document 130). In addition, copy program 200 can identify metadata that is stored in database 154 and associated with the source of the copied content. For example, database 154 can store metadata associated with source document 130, metadata associated with the author of the copied content and/or source document 130 (e.g., a user of client device 110), metadata associated with the user that is selecting the content to copy (e.g., a user of client device 120), etc. In an example aspect, copy program 200 identifies metadata that indicates attributes, entities, and context of the selected content.

In an example embodiment, copy program 200 analyzes the selected content and source document 130 to identify metadata. In an additional example embodiment, copy program 200 identifies metadata (and other relevant information) that is stored in database 154 and associated with source document 130, the selected content, the author, or a combination thereof. In such embodiments, the identified metadata and information can include metadata indicating the author, tags that the author applied to the selected content and source document 130, content usage guidelines associated with source document 130 and the selected content, attributes of source document 130 and the selected content, comments, descriptive metadata providing information associated with source document 130 and the selected content, defined preferences and/or default preferences (e.g., a baseline, or user-defined, amount and definition of contextual information), etc. For example, the metadata tags can correspond to citation information (e.g., provide citation if used externally, indications of references to provide, etc.), whether content can be included in a copy/paste operation (e.g., locked content), category tags, attribute tags, contact information for an author, etc.

In another example scenario, copy program 200 analyzes the content usage guidelines of a website (e.g., source document 130) and identifies defined guidelines and preferences for sharing content that appears on the webpage. In this example scenario, the content usage guidelines of the website dictate that a user can copy and reproduce content from the website (e.g., images, program code, infographics, videos, documents, etc.), as long as the user provides a citation of the website and a link to the website. Accordingly, in response to the user indicating intent to copy content from the website (e.g., user selecting to copy program code from source document 130), copy program 200 associated the content usage guidelines information with the copy/paste operation.

In step 208, copy program 200 determines a classification of the selected content. In one embodiment, copy program 200 utilizes classification module 132 to analyze selected content for the copy operation (from step 204) and the source of the selected content (e.g., source document 130, identified in step 202) to determine one or more classifications. In various embodiments, copy program 200 leverages the NLP and machine learning capabilities of classification module 152 to determine classification(s) of the selected content and source document 130. In various aspects of the present invention, copy program 200 can determine one or more classifications associated with the selected content that indicate a type and/or category of content, such as program code, product information, confidential, medical information, historical information, educational information, personal information, financial information, etc.

In another aspect, copy program 200 can also determine a classification of the source location of the content selected for copy (e.g., source document 130). In an example scenario, copy program 200, utilizing classification module 152, analyzes an image that is selected to copy (in step 202). In this scenario, copy program 200 classifies the image as a medical information, based on an image classification analysis and an analysis of source document 130 (and associated metadata from step 206).

In various embodiments of the present invention, at runtime of a copy/paste operation (e.g., initiated in step 204), copy program 200 utilizes classification module to analyze the context of the selected content in source document 130 and classify the selected content into a predefined category and/or type. In an example embodiment, copy program 200, utilizing classification module 152, classifies the content that the user is selecting to copy (in step 204) as being program code.

In step 210, copy program 200 determines a classification of the target location. In one embodiment, copy program 200 utilizes classification module 152 to analyze an indicated target location for the copy/paste operation (i.e., a paste location, such as target location 140) to determine one or more classifications. In an alternate embodiment, if copy program 200 is not aware of, or does not have access to, target location 140, then copy program 200 can proceed to step 212. In various embodiments of the present invention, copy program 200 can utilize processes and techniques discussed previously with regard to step 208 to determine a classification (e.g., type and/or category) of target location 140). In another embodiment, copy program 200 identifies a predetermined ruleset (e.g., in database 154) that is associated with a classification of one or more of the user initiating the copy/paste operation, the selected content, source document 130, target location 140.

In an example embodiment, copy program 200 can analyze user behavior in copy/paste operations to determine information associated with a copy/paste operation to target location 140. In one example scenario, copy program 200 analyzes actions of a user while the user repeatedly copies and pastes semantically similar content, followed by copying and pasting content with similar attributes. For example, a user is preparing a report about vegetation in a certain region and reviews multiple sources of information. Then the user performs multiple sequential copy/paste operations of descriptions of plants from the multiple sources. In this example, copy program 200 determines a classification of the plant description content (e.g., determining attributes), stores the classification association, with the ability to apply the classification association a next time that the user copies data associated with the plants.

In step 212, copy program 200 extracts information associated with the selected content. In one embodiment, copy program 200 utilizes information from steps 206, 208, and 210 to determine which information to extract. In various embodiments, copy program 200 operates to extract the information at runtime of the copy/paste operation. In additional embodiments, copy program 200 stores a mapping of information (e.g., a mapping of content types/categories and corresponding attributes) in database 154 for later use. In additional embodiments, copy program 200 utilizes determined classifications (e.g., categories and types of content) to access database 154 to determine which attributes are mapped to the determined classifications. Copy program 200 can utilize the mapping information to determine which attributes of source document 130 to extract, such as author contact/attribution information, website citation, etc.

In an example scenario, copy program 200 (in step 206) identifies metadata associated with the selected content (from step 204) that includes a tag from an author indicating to cite the author when copying the selected content. In addition, copy program 200, based on (in step 208) an analysis of the selected content or the copy/paste operation and source document 130, determines a classification of "program code" for the selected content. Accordingly, copy program 200 (in step 212) extracts author citation information (e.g., social media contact information) and attributes from source document 130 that correspond to the "program code" classification (e.g., based on mapped associations in database 154). For example, copy program 200 extracts information attributes that are related to program code (per database 154), such as an author citation, a citation of source document 130, usage guidelines, link to support documentation, etc.

In an additional example scenario, copy program 200 (in step 208) analyzes an image included in the selected content and classifies the image as a "medical information," based on an image classification analysis and an analysis of source document 130. In this example scenario, copy program 200 determines that the classification of "medical information" is associated with required attributes of "data" and "time." Accordingly, copy program 200 extracts date and time information from source document 130 (step 212). In further embodiments, copy program 200 can utilize user behavior information (from step 210) to determine which information to extract.

In example embodiments, copy program 200 utilizes entity recognition to extract entities from text based on pattern matching, linguistics, syntax, semantics, machine learning, or a combination thereof. Copy program 200 can extract attributes and entities based on a mapping of content categories to context attributes (e.g., in database 154) to extract entities and attributes that are relevant to a content type or category, based on a classification.

In step 214, copy program 200 updates the clipboard with the extracted information associated with the selected content. In one embodiment, copy program 200 updates clipboard 126 to include the selected content (from step 204) and the extracted information associated with the selected content (from step 212). In another embodiment, copy program 200 can update the clipboard with at least a defined baseline of information (e.g., metadata indicating that the content was copied, metadata indicating the source, etc.). In various embodiments, copy program 200 can update the clipboard with the extracted information as metadata that is included with and associated with the selected content in a paste operation, additional text or content included in a paste operation, etc. In an example embodiment, copy program 200 updates the copy/paste buffer (e.g., temporary storage) of clipboard 126 with information extracted in step 212.

In step 216, copy program 200 receives a request to paste to the target location. In one embodiment, copy program 200, subsequent to determining that a user is selecting content to copy (in step 204), receives a request from the user to paste the copied content to target location 140. For example, copy program 200 receives the paste request via user input into user interface 122 of client device 120 to paste content to target location 140, indicating a location within target location 140.

In step 218, copy program 200 pastes the selected content and associated information from the clipboard. In one embodiment, copy program 200 pastes the selected content (from step 204) and associated information (extracted in step 212 and utilized to update the clipboard in step 214) from clipboard 126 to target location 140. In an additional embodiment, copy program 200 applies corresponding transformation rules during the copy/paste operation to ensure that the information content is replicated to the destination (e.g., for the copied content and associated information). Copy program 200 can paste copied content along with the extracted content from the clipboard as additional text, as associated metadata, or a combination thereof.

Embodiments of the present invention provide a system (e.g., through use of copy program 200) that utilizes machine learning to classify a source document and determine which context attributes and entities are important. Accordingly, copy program 200 can include the information in a destination document (e.g., target location 140), along with the original content. Additional aspects of the present invention can provide advantages of automatically extracting and including accurate citations of sources for content. Embodiments of the present invention can also leverage access control information of a document or user to determine whether to allow copying or sharing of content (e.g., preventative measures for confidential information).

In an example embodiment, source document 130 is a source code repository that includes a plurality of code snippets. In response to a user of client device 120 selecting a code snippet from source document 130 for a copy/paste operation, copy program 200 automatically creates a citation (e.g., as a code comment, README, etc.) to highlight the code usage across multiple projects/locations.

Figure 3:
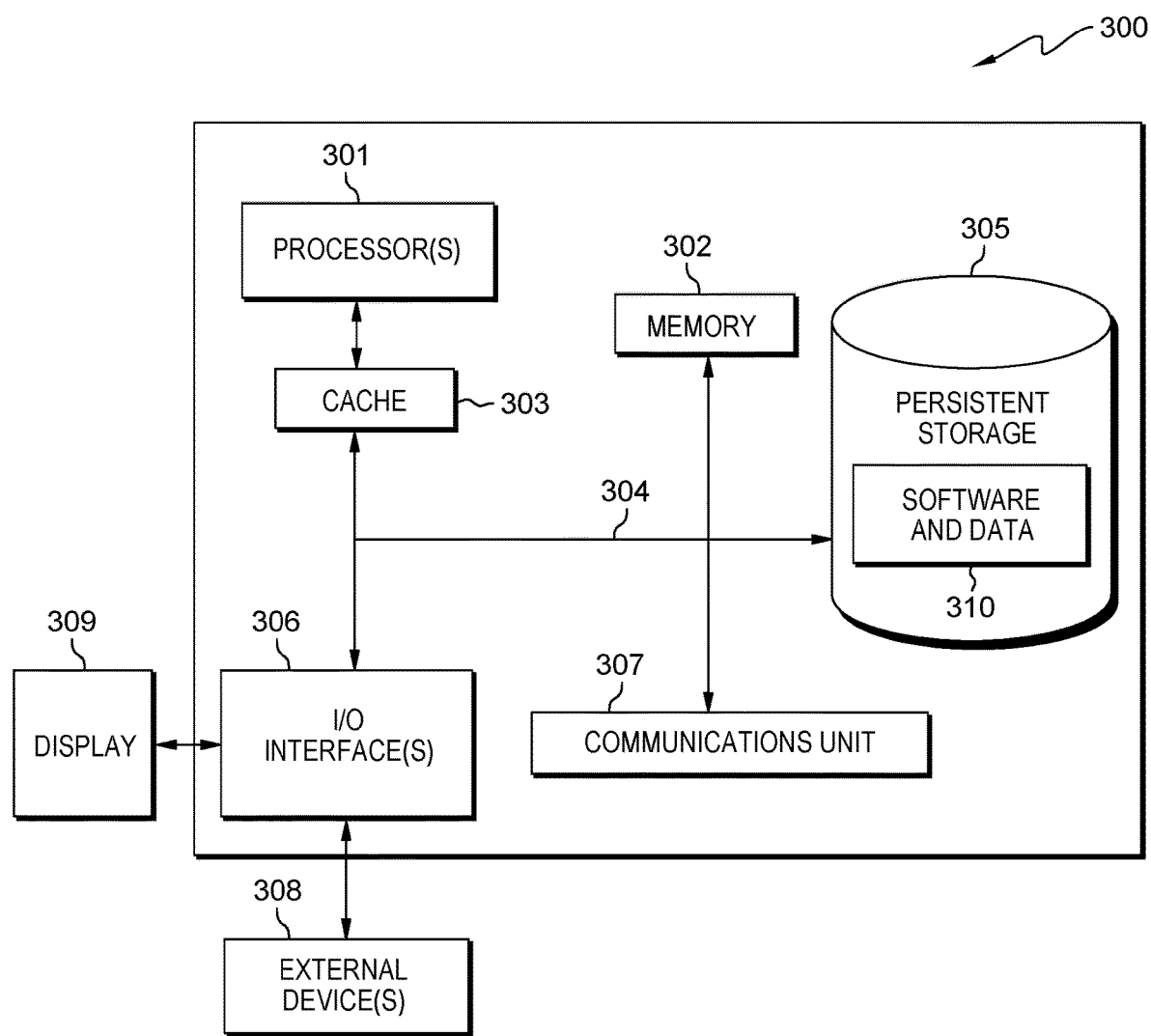
FIG. 3 depicts a block diagram of components of a computing system representative of the client devices and server of FIG. 1, in accordance with an embodiment of the present invention.

FIG. 3 depicts computer system 300, which is representative of client device 110, client device 120, and server 150, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 110, software and data 310 is representative of user interface 112 and application 114. With respect to client device 120, software and data 310 is representative of user interface 122, application 124, and clipboard 126. With respect to server 150, software and data 310 is representative of classification module 152, copy program 200, and database 154.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    determining, by one or more processors, that a user provides input selecting content, within a document, and input adding the selected content to a clipboard;
    identifying, by one or more processors, metadata, included within the document, that is associated with the selected content;
    identifying, by one or more processors, author preference information for the selected content based on the identified metadata, the author preference information including usage and attribution instructions that correspond to the selected content, as defined by an author associated with the selected content;
    extracting, by one or more processors, information associated with the selected content from the document based on the author preference information; and
    updating, by one or more processors, the clipboard with the selected content and the extracted information.

2. The method of claim 1, further comprising:
    in response to receiving a request from the user to initiate a paste operation to a target location, pasting, by one or more processors, the selected content and the extracted information from the clipboard to the target location.

3. The method of claim 2, further comprising:
    determining, by one or more processors, a classification of the selected content based on analyzing the selected content and the document utilizing Natural Language Processing (NLP);
    determining, by one or more processors, a classification of the target location; and
    extracting, by one or more processors, information from the document based on the determined classification of the selected content and the determined classification of the target location.

4. The method of claim 3, wherein extracting information associated with the selected content from the document based on the determined classification, further comprises:
    determining, by one or more processors, attributes that are associated with the determined classification of the selected content; and
    extracting, by one or more processors, information from the document that is associated with the determined attributes.

5. The method of claim 1, wherein:
    the document is a webpage, and
    the selected content is program code.

6. The method of claim 1, wherein the clipboard is a copy/paste buffer for a copy/paste operation.

7. A computer program product comprising:
    one or more computer readable storage media and program instructions stored on the one or more computer readable storage media, the program instructions comprising:

program instructions to determine that a user provides input selecting content, within a document, and input adding the selected content to a clipboard;

program instructions to identify metadata, included within the document, that is associated with the selected content;

program instructions to identify author preference information for the selected content based on the identified metadata, the author preference information including usage and attribution instructions that correspond to the selected content, as defined by an author associated with the selected content;

program instructions to extract information associated with the selected content from the document based on the author preference information; and program instructions to update the clipboard with the selected content and the extracted information.

8. The computer program product of claim 7, further comprising program instructions, stored on the one or more computer readable storage media, to:

in response to receiving a request from the user to initiate a paste operation to a target location, paste the selected content and the extracted information from the clipboard to the target location.

9. The computer program product of claim 8, further comprising program instructions, stored on the one or more computer readable storage media, to:

determine a classification of the selected content based on analyzing the selected content and the document utilizing Natural Language Processing (NLP);

determine a classification of the target location; and extract information from the document based on the determined classification of the selected content and the determined classification of the target location.

10. The computer program product of claim 9, wherein the program instructions to extract information associated with the selected content from the document based on the determined classification, further comprise program instructions to:

determine attributes that are associated with the determined classification of the selected content; and extract information from the document that is associated with the determined attributes.

11. The computer program product of claim 7, wherein the clipboard is a copy/paste buffer for a copy/paste operation.

12. A computer system comprising:
one or more computer processors;
one or more computer readable storage media; and
program instructions stored on the computer readable storage media for execution by at least one of the one or more processors, the program instructions comprising:

program instructions to determine that a user provides input selecting content, within a document, and input adding the selected content to a clipboard;

program instructions to identify metadata, included within the document, that is associated with the selected content;

program instructions to identify author preference information for the selected content based on the identified metadata, the author preference information including usage and attribution instructions that correspond to the selected content, as defined by an author associated with the selected content;

program instructions to extract information associated with the selected content from the document based on the author preference information; and program instructions to update the clipboard with the selected content and the extracted information.

13. The computer system of claim 12, further comprising program instructions, stored on the computer readable storage media for execution by at least one of the one or more processors, to:

in response to receiving a request from the user to initiate a paste operation to a target location, paste the selected content and the extracted information from the clipboard to the target location.

14. The computer system of claim 13, further comprising program instructions, stored on the computer readable storage media for execution by at least one of the one or more processors, to:

determine a classification of the selected content based on analyzing the selected content and the document utilizing Natural Language Processing (NLP);

determine a classification of the target location; and extract information from the document based on the determined classification of the selected content and the determined classification of the target location.

15. The computer system of claim 14, wherein the program instructions to extract information associated with the selected content from the document based on the determined classification, further comprise program instructions to:

determine attributes that are associated with the determined classification of the selected content; and extract information from the document that is associated with the determined attributes.

16. The computer system of claim 12, wherein:
the document is a webpage, and
the selected content is program code.

17. The computer system of claim 12, wherein the clipboard is a copy/paste buffer for a copy/paste operation.

18. The method of claim 1, wherein extracting information associated with the selected content from the document based on the author preference information further comprises:

determining, by one or more processors, that the identified author preference information for the selected content includes an instruction to include an author citation when copying content; and extracting, by one or more processors, author citation information that corresponds to the selected content from the document.

19. The method of claim 1, wherein extracting information associated with the selected content from the document based on the author preference information further comprises:

determining, by one or more processors, that the selected content is program code; and extracting, by one or more processors, a link to support documentation, from the document, that is associated with the program code.

* * * * *